United States Patent [19]
Nocito et al.

[11] 3,878,411
[45] Apr. 15, 1975

[54] COMPENSATING POSITIONING SYSTEM

[75] Inventors: Bernabe Nocito, Canoga Park; Clifford R. Frohmberg, Woodland Hills, both of Calif.

[73] Assignee: Xynetics, Inc., Canoga Park, Calif.

[22] Filed: Feb. 1, 1974

[21] Appl. No.: 438,701

Related U.S. Application Data

[63] Continuation of Ser. No. 264,718, June 21, 1972, abandoned.

[52] U.S. Cl. ............... 310/12; 318/135; 318/58; 310/13
[51] Int. Cl. ............................. H02k 41/02
[58] Field of Search ......... 318/35, 37, 135, 38, 687; 310/12-14

[56] References Cited
UNITED STATES PATENTS

| | | | |
|---|---|---|---|
| 3,273,727 | 9/1966 | Rogers et al. | 310/13 X |
| 3,449,754 | 6/1969 | Stutz | 310/13 X |
| 3,457,482 | 7/1969 | Sawyer | 310/13 X |
| 3,668,443 | 6/1962 | Schwartz | 310/13 X |

Primary Examiner—Donovan F. Duggan
Attorney, Agent, or Firm—Ellsworth R. Roston

[57] ABSTRACT

A positioning system for providing a controlled, relative movement between two members along at least either a single axis or along first and second coordinate axes and including a first member such as a magnetic platen having either upstanding spaced ridges of magnetic material or upstanding teeth forming a grid pattern to provide magnetic energy configurations and in a two-axis system having at least two of these energy configurations disposed relative to each other along the coordinate axes. A second member such as a head member is disposed for movement relative to the first member along the axes with the second member including at least first and second means and with each means selectively energizable for providing forces between the second member and the first member in cooperation with the individual energy configurations to provide independent movement of the second member along the axes and with the first and second means providing compensating forces to cancel out harmonics to provide an improved linearity of movement of the second member along the axes.

28 Claims, 13 Drawing Figures

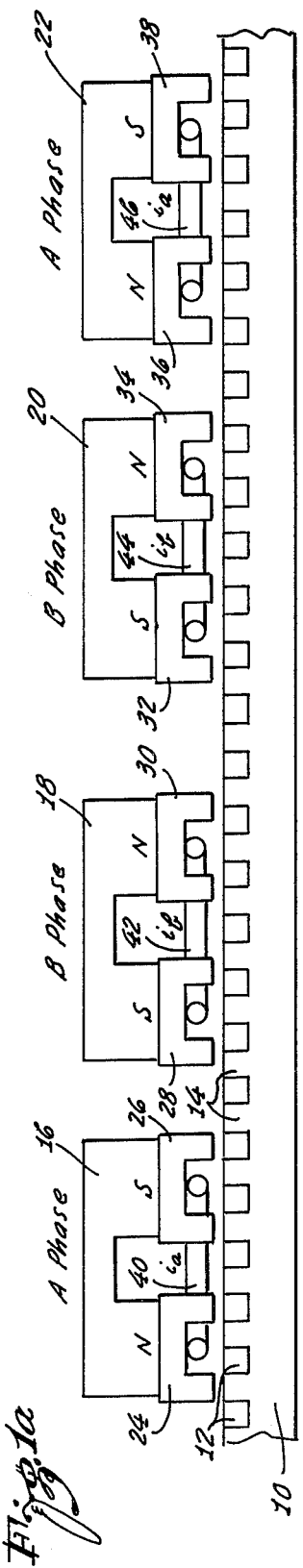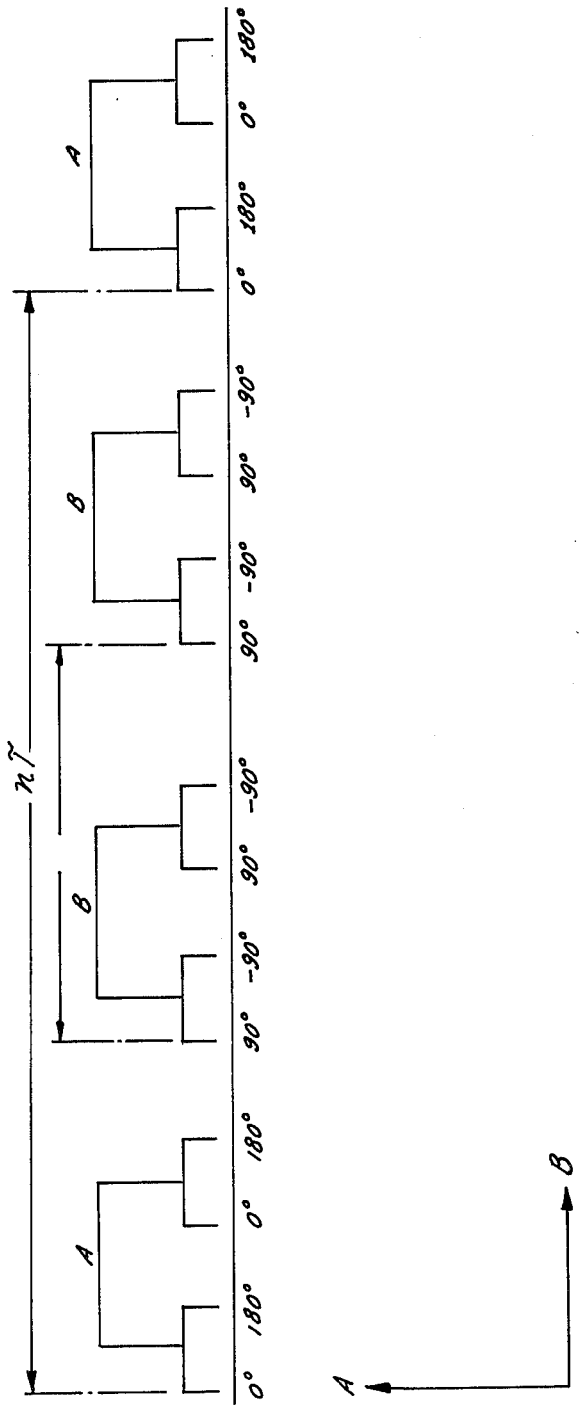
Fig. 1a (Prior Art)
Fig. 1b
Fig. 1c

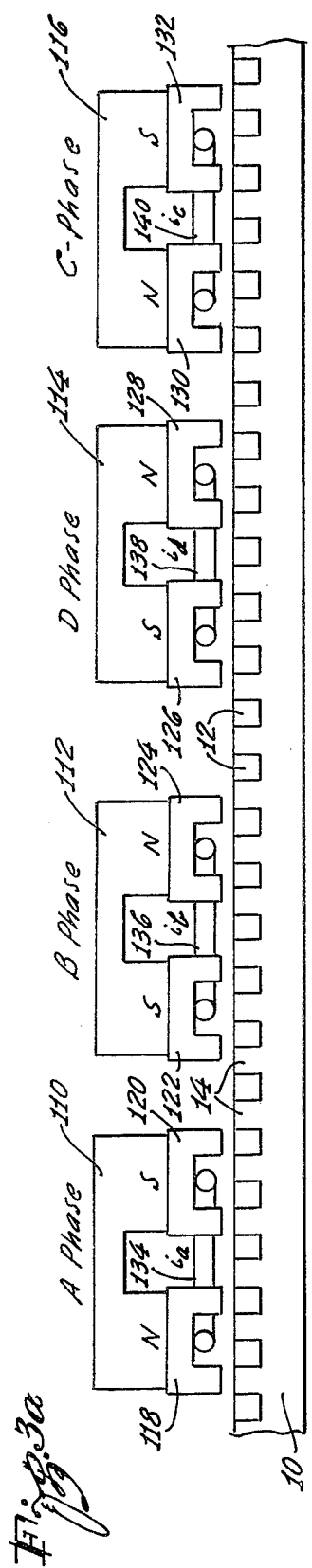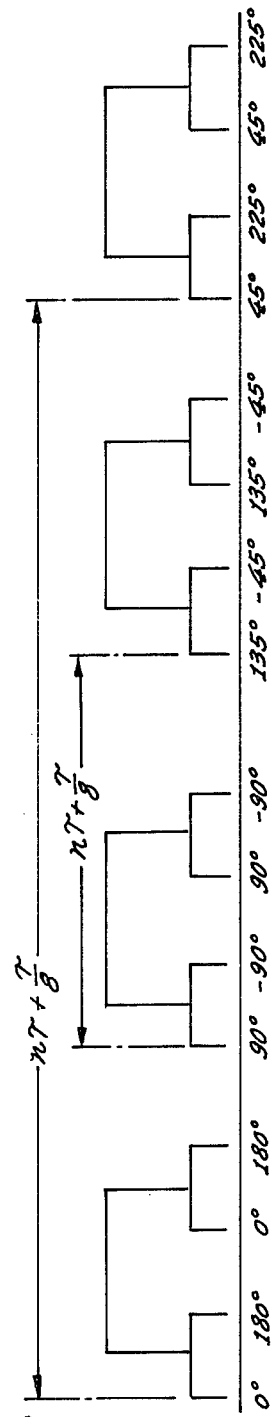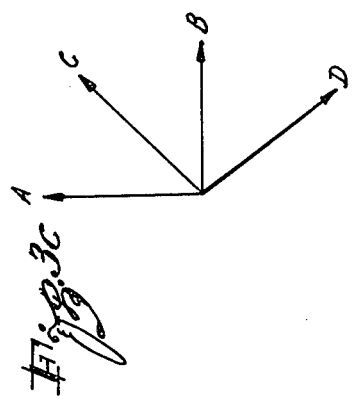

COMPENSATING POSITIONING SYSTEM

RELATED APPLICATION

This is a continuation of my application Ser. No. 264,718, filed June 21, 1972, now abandoned.

The present invention is directed to a positioning system providing for a controlled relative movement between a head and a platen. The platen may be formed of material such as magnetic material and may have a pattern of spaced upstanding ridges of magnetic material for a first embodiment of the invention. In a second embodiment of the invention, the magnetic platen is formed of a single pattern of upstanding teeth of magnetic material to provide for a grid pattern. In both embodiments of the invention, a head member is located adjacent to the platen and includes corresponding electromagnetic means which, when selectively energized, provides for a magnetic force between the head and the platen to provide a movement of the head relative to the platen. The head may include separate means to provide movement of the head along two coordinate axes relative to the platen, but it is to be appreciated that the invention is also applicable to the movement of a head relative to a platen and with this movement provided along a single axis.

The general type of positioning system described above may be of the type disclosed in U.S. Reissue Pat. Nos. 27,289 and 27,436, listing Bruce A. Sawyer as the inventor, or in U.S. Pat. Nos. 178,637 and 178,753. The first of these applications lists Bruce A. Sawyer as the inventor, and the second of these applications lists Walter E. Hinds as the inventor. The movement of the head relative to the platen in all of these above-referenced positioning systems may use a control system for selectively energizing the head and providing a controlled movement of the head relative to the platen, which control system may be of the type described in the copending patents and patent applications or in copending U.S. application Ser. No. 36,177, listing Bruce A. Sawyer as the inventor.

The present invention is an improvement upon the positioning systems described in the above-referenced patents and patent applications and reference is hereby made to these patents and patent applications for greater detail as to the particular structure and operation of the head, platen and control system.

The present invention is directed to a positioning system wherein the head includes different means and with each means selectively energizable for providing forces between the head and the platen in cooperation with the energy configurations of the platen so as to provide movement of the head relative to the platen. The separate means are displaced relative to each other and are selectively energized so as to provide compensation for harmonic force variations which existed with the prior art positioning systems and which provided for non-linearity in the movement of the head relative to the platen.

A problem of non-linearity with resultant instability has arisen in all of the above-referenced positioning systems but more particularly in those systems which provided for movement of the head relative to the platen along a single axis. In these single-axis systems the platen is formed with upstanding ridges to provide movement of the head in a direction perpendicular to the ridges. It is to be appreciated that two such single-axis platens may be used to provide movement of a head along two coordinate axis.

The non-linearity shows up as variations from a desired line of movement of the head relative to the platen between two predetermined points. Specifically, it has been determined that these variations from the desired line of movement results from a fourth order harmonic of these force produced between the head and the platen, even when the excitation of the head is sinusoidal. This fourth order harmonic provides for the movement of the head between two predetermined points to have variations from the desired line of movement. These variations provide for a line of movement which appears to be sinusoidal in nature around the desired line of movement and with a change over 4 times in each 360° of electrical excitation.

This fourth order harmonic therefore provides for two problems in the operation of the positioning systems described above. First, the linearity of these positioning systems is disturbed and where such positioning systems are used as part of automatic drafting equipment or laser beam cutting equipment, etc., this non-linearity results in inaccuracies in the final resultant product produced by this equipment. In addition, this fourth order harmonic reduces stability of the system because the fourth order harmonic is the mechanical equivalent of a resonance which has a frequency four times that of the electrical excitation. This resonance provides for instability and it would be desirable to smooth down the system by eliminating this instability.

The present invention overcomes the problems caused by the fourth order harmonic by modifying the existing heads to include at least two separate driving means for each axis of movement and with a phase difference of 45° in the excitation of the two different driving means. Both driving means are mounted in a single head to provide for a composite head having first and second phase excitation and with the non-linearities and instabilities of one driving means used to compensate for the non-linearities and instabilities of the second driving means to thereby provide for a head member which has improved linearity and stability.

In the prior art positioning systems, the head member included at least two pairs of elements for each axis and with the pairs energized with sine and cosine signals which were referred to as A and B phase excitation. In the present invention, the head member also includes four elements, having A, B, C and D phase excitation and with the C and D phase excitation phase shifted 45° from the A and B phase excitation. In order to provide for a mechanical correlation to this 45° shift in phase excitation of the physical position between the C and D phase elements as a group is shifted relative to the A and B phase elements as a group to conform to this 45° shift in electrical excitation.

A clearer understanding of the invention will be had with reference to the following description and drawings wherein:

FIG. 1a illustrates a prior art arrangement for a head member of A and B phase elements relative to a platen;

FIG. 1b schematically illustrates the electrical phase excitation of the A and B phase elements of FIG. 1a and the physical displacement between groups of elements;

FIG. 1c illustrates the phase displacement between A and B vectors which represent the electrical signals applied to the A and B phase elements of FIG. 1a;

FIG. 3a illustrates an arrangement according to the present invention of a head member including A, B, C and D phase elements relative to a platen;

FIG. 3b illustrates schematically the electrical excitation of the phase elements of FIG. 3a and the physical displacement between the groups of elements so as to conform to the electrical excitation;

FIG. 3c illustrates the phase displacement between A, B, C and D vectors representing the electrical signals applied to the A, B, C and D phase elements of FIG. 3a;

Figure 2A:
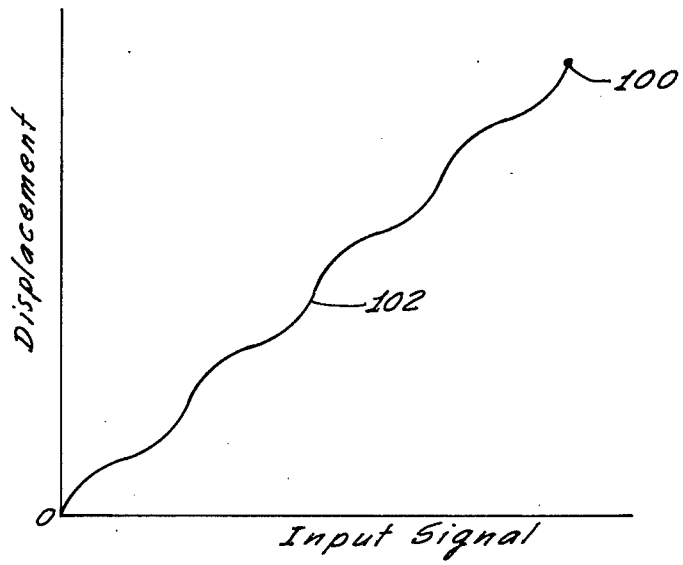
FIG. 2a is a graph showing the movement of a head member between two points in response to an input signal for the prior art system of FIG. 1.

In FIGS. 1a, 1b and 1c, prior art positioning system is shown. Specifically, in FIG. 1a, a platen member 10 may be formed of ferro-magnetic material such as iron, and with the platen having a plurality of parallel grooves 12 formed therein so as to form upstanding portions 14. The upstanding portions 14 may be either ridges or teeth, depending upon the design of the platen 10. Located above the platen 10 are a group of magnets 16, 18, 20 and 22, which magnets are referred to as A or B phase magnets, depending upon the phase excitation of the magnets. The construction of each of these magnets is the same in that each magnet has two pole pieces. For example, magnet 16 includes pole pieces 24 and 26; magnet 18 includes pole pieces 28 and 30; magnet 20 includes pole pieces 36 and 38. In addition, each of the magnets 16 through 22 includes a coil intercoupled between the pole pieces. For example, magnet 16 includes a coil 40; magnet 18 includes coil 42; magnet 20 includes coil 44; and magnet 22 includes coil 46. The coils 40 through 46 are energized with signals of either an A phase or a B phase as shown by the current designation adjacent to each coil.

Each of the pole pieces of each of the magnets include two pole faces. It is to be appreciated that each pole face may comprise a single ridge as shown in FIG. 1a, but each pole face may also comprise a plurality of spaced ridges which would cooperate with upstanding magnetic portions 14 shown in FIG. 1.

The pole faces of each pole piece are spaced such that when one is over an upstanding magnetic portion 14 of the platen 10, the other is over a non-magnetic portion formed by the grooves 12. This relationship between the magnet 16 and the platen 10 is shown in FIG. 1a. The magnet 18 is space from the magnet 16 so that when the magnet 16 has its pole faces directly over an upstanding portion 14 or a groove 12, the pole faces of the magnet 18 are midway between an upstanding portion 14 and a groove 12 between the upstanding portion. The magnets 20 and 22 are spaced from each other in a similar manner to that described above.

The set of magnets 16 and 18 is spaced from the set of magnets 20 and 22 as shown in FIG. 1b. It can be seen in FIG. 1b that this spacing between the two sets of magnets is designated as $\eta\tau$, wherein $\eta$ is any whole number and $\tau$ is the pitch or a distance representing 360 electrical degrees. FIG. 1b also illustrates the phase of the signals at the various pole faces when energized by electrical signals represented by the A and B vectors spaced 90° apart as shown in FIG. 1c. Specifically, the magnets 16 and 22 are energized by an A phase signal to have the forces at the pole faces at 0° and 180°C. The magnets 18 and 20 are energized by a B phase signal to have the forces at the pole faces at 90° and −90°. The A and B phase electrical signals are represented by the A and B vectors shown in FIG. 1c.

The system as shown in FIG. 1a, 1b and 1c, is that of the prior art, wherein sine and cosine signals may be used to apply the A and B phase signals. This prior art is represented by U.S. Reissue Pat. No. 27,289 or in application Ser. Nos. 178,637 and 178,753. This prior art system, although successful in operation, does have a problem in that a fourth order harmonic of force produces non-linearity and instability in the movement of the head relative to the platen. This non-linearity may be seen with reference to FIG. 1a, wherein a graph illustrates displacement of the head versus an input signal. It can be seen in FIG. 2a that when signals are applied to move the head member along a straight line from a first point, which is shown as the zero point, to a second point represented by the point 100, the actual movement instead of following a straight line has variations from the straight line, as shown by line 102. These variations were found to be cyclic in nature and represented a fourth order harmonic of force. These variations from a desired movement of the head represent a non-linearity in the movement and, in addition, provide for instability because of these constant variations from the desired movement.

Figure 2B:
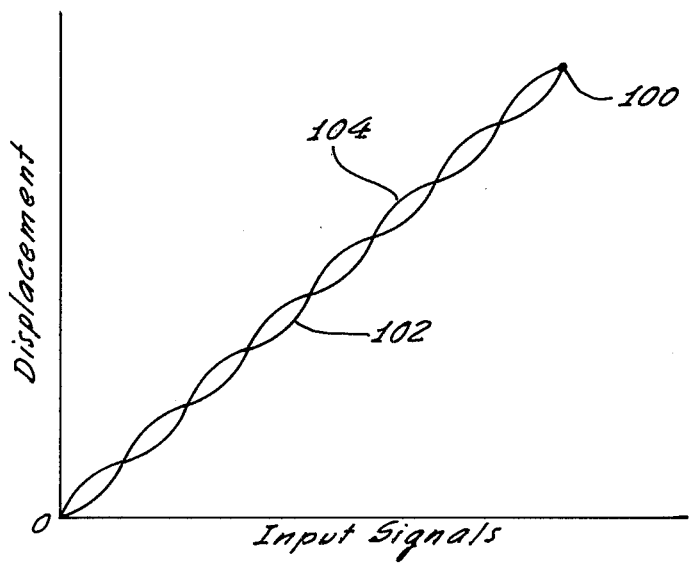
FIG. 2b illustrates the movement for two separate prior art head members between two points wherein the excitation of one head member is shifted electrically 45° from the other head member.
Figure 2C:
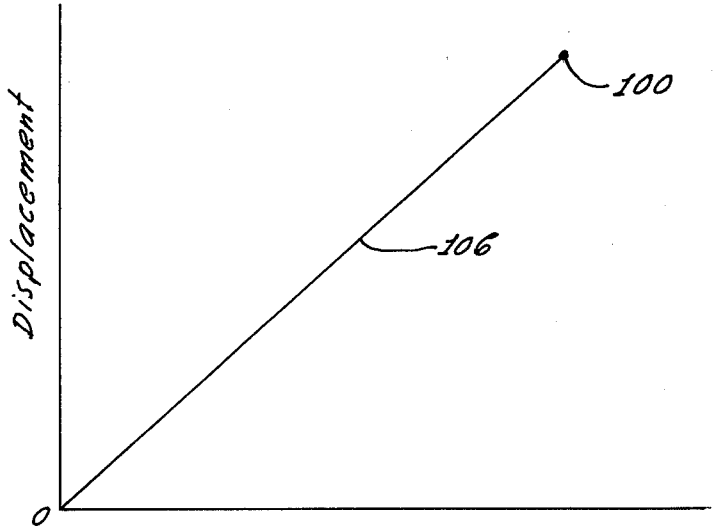
FIG. 2c illustrates a resultant movement of a head member between two points which movement is a composite of the movement of the two head members shown in FIG. 2b.

FIG. 2b illustrates a graph showing head displacement versus input signals and including the displacement 102 shown in FIG. 2a. In addition, a second displacement representing the movement of a head similar to that shown in FIG. 1a, but wherein the input signals are displaced 45°, is represented by a second line 104. It can be seen that curve 104 is complementary to curve 102, so that the displacements of the two heads represented by these two separate curves would be complementary to each other. If these two heads are mechanically linked, then a displacement for this composite head would be as shown in FIG. 2c. In FIG. 2c, it can be seen that the displacement from the zero point to the point 100 by the composite head, as shown by the line 106, represents a movement of the composite head in a linear fashion and with high stability.

In order to provide for a composite head, as discussed with reference to FIGS. 2b and 2c, it is not necessary to actually have eight separate magnets, but rather a total of four magnets, as shown in FIG. 3a. Specifically in FIG. 3a, the platen 10 having the upstanding portion 14 and the grooves 12, is substantially identical to that shown in FIG. 1a. The individual magnets 110, 112, 114 and 116 are also substantially identical to the magnets shown in FIG. 1a. For example, magnet 110 includes pole pieces 118 and 120; magnet 112 includes pole pieces 122 and 124; magnet 114 includes pole pieces 126 and 128; and magnet 116 includes pole pieces 130 and 132. Each of the pole pieces is shown to have two pole faces, but it is to be appreciated that each pole face may comprise a plurality of spaced ridges. Each of the magnets is energized using coils and magnet 110 has a coil 134; magnet 112 has a coil 136; magnet 114 has a coil 138; and magnet 116 has a coil 140.

The spacing of the pole faces of each individual magnet relative to the platen 10 is similar to that shown in FIG. 1a. In addition, the spacing between magnets 110 and 112 is also the same as that described with reference to FIG. 1a, and the spacing between magnets 114 and 116 is the same as that discussed with reference to FIG. 1a. However, the spacing between the sets of magnets is different from that shown in FIG. 1b. This can be seen with reference to FIG. 3b wherein the spacing between the sets of magnets is given as $\eta\tau + \tau/8$ wherein $\eta$ represents any whole number and $\tau$ represents the pitch or 360 electrical degrees. The additional distance of $\tau/8$ provides for an increase in the equivalent phase displacement between the sets of magnets of 45°. This physical distance, in turn, corresponds with a phase displacement in the excitation between the set of coils 134 and 140 and the set of coils 136 and 138.

The phase displacement of the electrical signals as represented by vectors A, B, C and D can be seen in FIG. 3c, wherein two sets of vectors each 90° apart represent the electrical signals applied to the coils 134 through 140. For example, as shown in FIG. 3b, the energization of the magnets 110 and 112 has an A and B phase energization which is similar to the energization of the magnets 16 and 18 of FIG. 1a. However, the magnets 114 and 116 are given D and C phase energization which is phase displaced 45° relative to the energization of the magnets 110 and 112. The C phase signal may be formed by adding the A and B phase signals and, with the proper scaling. The D phase signal may be formed by substracting the A phase signal from the B phase signal, and with again the proper scaling. The system shown in FIGS. 3a, 3b and 3c, is the electrical equivalent of mechanically coupling a pair of head members each having complementary non-linear movement, as shown in FIG. 2b. The composite head therefore provides for the linear stable movement as represented by the line 106 in FIG. 2c, and represents an improvement of the movement of the head member relative to the platen.

Figure 4:
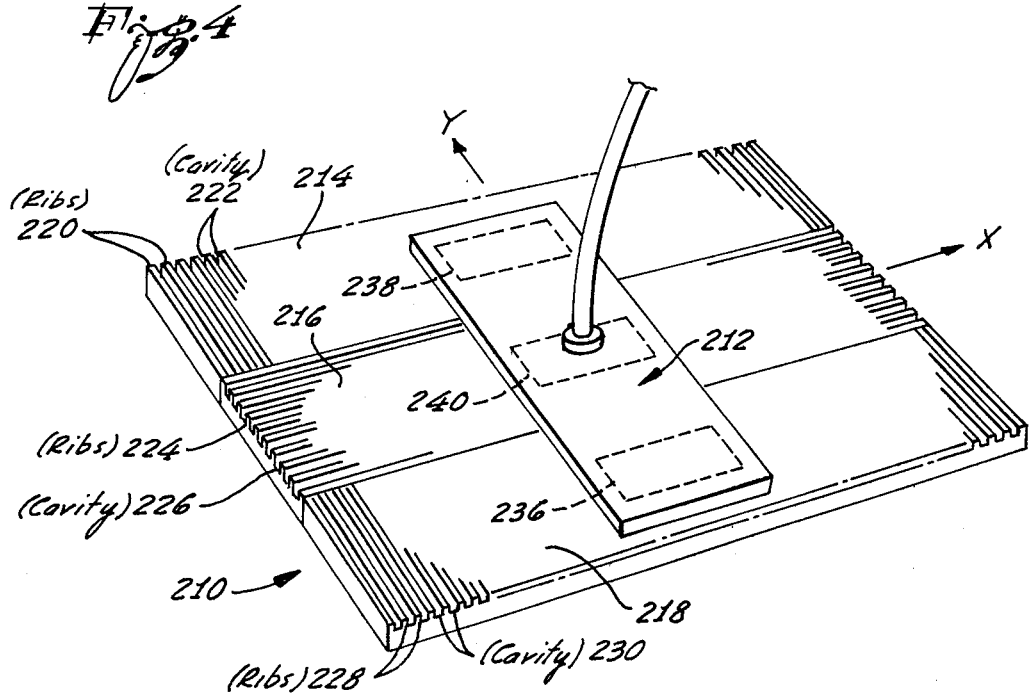
FIG. 4 illustrates a first embodiment of the invention used with a magnetic platen having upstanding ridges of magnetic material.
Figure 5:
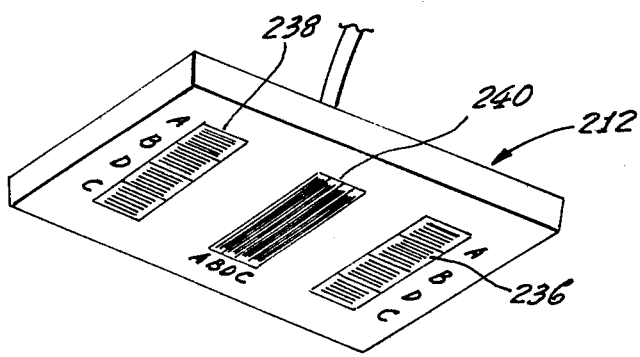
FIG. 5 illustrates the magnetic head used with the platen of FIG. 4 and showing the positioning of the phase elements of the present invention.

FIGS. 4 and 5 illustrate a first embodiment of the present invention as applied to a positioning system including two single-axis positioners. It is to be appreciated that the structure of the present invention would also work in a single-axis system and is not limited to a dual-axes system. In FIGS. 4 and 5, the first embodiment of the positioning system of the present invention includes a platen 210 and a head 212. The platen is divided into three separate areas 214, 216 and 218. Each of the separate areas includes a plurality of ridges of magnetic material which ridges in each area are parallel to each other. For example, area 214 includes ridges 220, separated by spaces 222; area 216 includes ridges 224, separated by spaces 226; and area 218 includes ridges 228 separated by spaces 230.

It can be seen with reference to the platen 210 that the platen may actually be composed of a single piece of material, such as soft iron, and with the ridges in the separate spaces 214, 216 and 218 being formed from the single piece of magnetic material. It can also be seen with reference to FIG. 4 that the areas 214 and 218 have ridges which are parallel and in line with each other and the area 216 includes ridges which are perpendicular to the ridges of the areas 214 and 218. The areas 214 and 118 provide for magentic energy configuration, which is used in cooperation with means located in the head 212 to provide for a movement of the head 212 in and X direction, as shown by the arrow. The area 216 has a magnetic energy configuration which cooperates with means in the head 212 to provide for a movement of the head 212 in a Y direction, as shown by the arrow.

FIG. 5 illustrates the underside of the head member 212, and wherein the head includes a plurality of electromagnetic means to cooperate with the areas 214, 216 and 218 of the platen 210. The head 212 includes a first group of electromagnetic means 236 which cooperate with the area 218 and a second group of electromagnetic means 238 which cooperate with the area 214. The head also includes a third group of electromagnetic means 240 which cooperate with the area 216.

The electromagnetic means 236, 238 and 240, are each subdivided into four elements labeled A, B, C and D, which represent the A, B, C and D magnets shown in FIG. 3a and which elements have the same physical and electrical configuration and excitation as disclosed with reference to FIGS. 3a, 3b and 3c. Specifically, the interaction of the magnetic fields produced by the electromagnetic means 236, 238 and 240, with the magnetic material of the ridges in the areas 214, 216 and 218, provides for an independent movement of the head member 212 along the X and Y axes in accordance with the selective energization of the electromagnetic means 236, 238 and 240. It is to be appreciated, as indicated above, that since this movement of the head member 212 is independent along the X and Y axes, the present invention may also be included with a linear motor which operates along a single axis. For example, the head member may include only a first group of electromagnetic means, such as electromagnetic means 236, and with the platen formed only of a single area such as the area 218 to provide for a linear positioning system.

Figure 6:
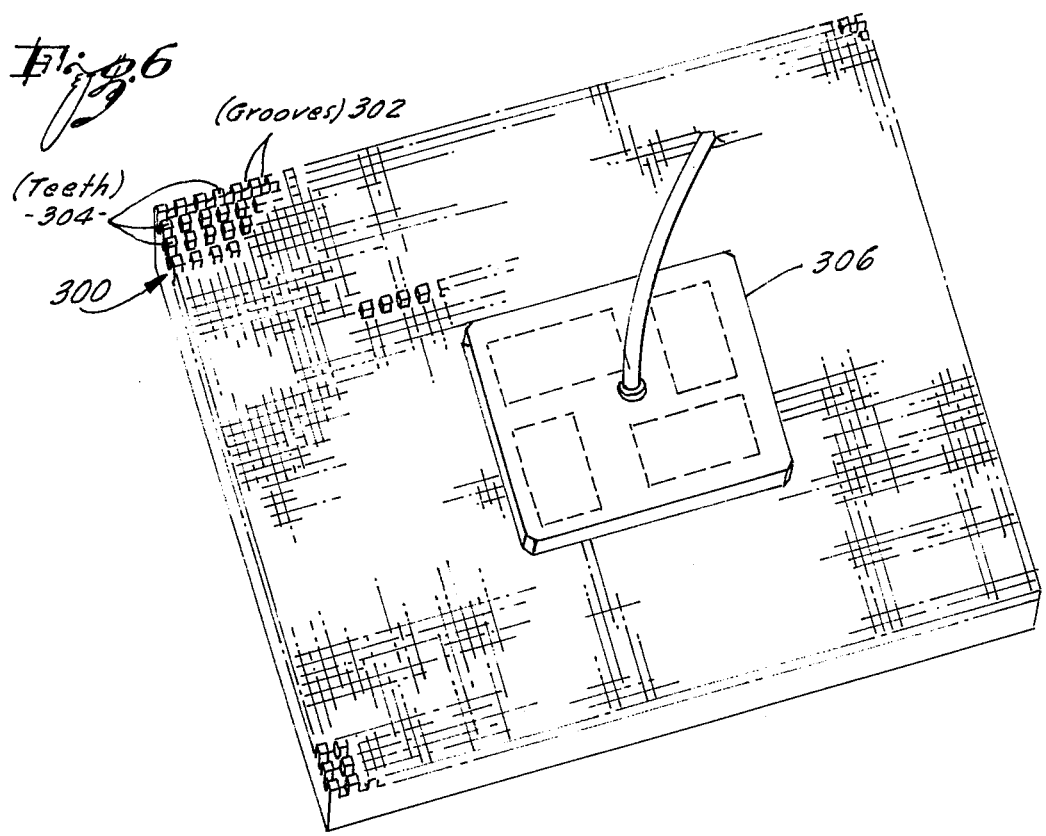
FIG. 6 illustrates a second embodiment of the invention showing the use of a magnetic platen having a grid pattern of upstanding teeth.
Figure 7:
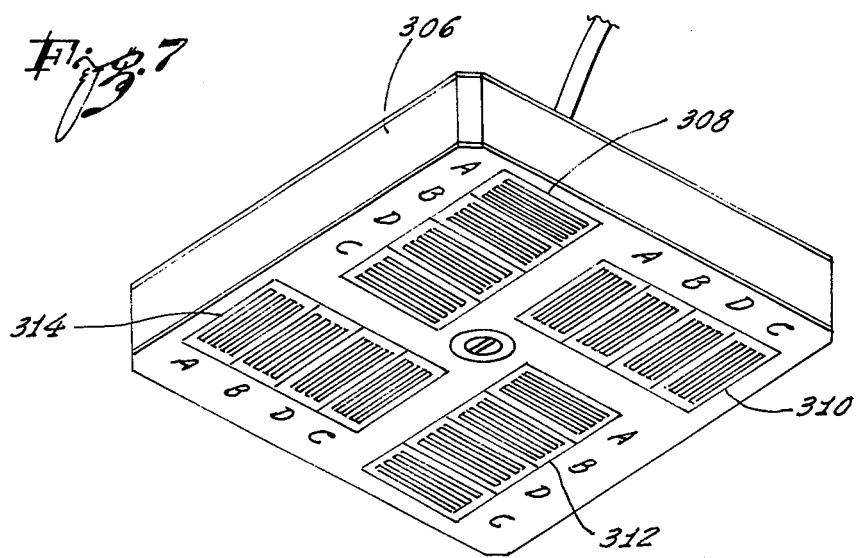
FIG. 7 illustrates the positioning of the individual phase elements of the head member of the present invention for use with the platen of FIG. 6.

FIGS. 6 and 7 illustrate a second embodiment of the positioning system of the present invention, including a platen 300 formed of ferromagnetic material, such as iron, and having two sets of parallel grooves 302 formed therein with one set of grooves normal to the X axis, and the second set of grooves normal to the Y axis. The two sets of grooves therefore provide for magnetic teeth 304 which project upwardly. Normally the grooves are at right angles to each other, and are equally spaced so that the magnetic teeth have a square cross-section. The upstanding teeth and grooves provide for a magnetic energy configuration which is used in cooperation with electromagnetic means located in a head member 306 shown in FIG. 7, so as to provide for movement of the head along both the X and Y axes.

FIG. 7 illustrates the underside of the head member 306, and wherein the head member includes a plurality of electromagnetic means 308, 310, 312 and 314, to cooperate with the platen 300. The electromagnetic means 308 through 314 are shown subdivided into four elements labeled A, B, C and D which represent the A, B, C and D magnets shown in FIG. 3a and having the mechanical and electrical configuration shown in FIGS. 3a and 3b with the excitation as shown in FIG. 3c.

It can be seen, therefore, that the present invention is directed to a positioning system which has improved linearity and stability over the prior art systems and achieves this improved linearity and stability by adding a second phase of electromagnetic means which are energized and mechanically positioned having a 45° phase shift from a first phase of electromagnetic means so as to compensate for a fourth order harmonic of force which produces non-linearity and instability. This system is applicable to one and two-axes systems and may be incorporated into present systems by changing the head structure and by making changes in the energization of this head structure. The invention has been shown applicable to two embodiments and although this disclosure has been limited to these two embodiments, it is to be appreciated that adaptations and modifications may be made, and the invention is only to be limited by the appended claims.

What is claimed is:

1. A positioning system for providing a controlled relative movement between two members along at least a first axis, including:

a first member forming a platen having at least a first area having a first energy configuration, and a second member disposed relative to the first member for independent movement relative to the first member along the first axis and with the second member including first means cooperative with the first area in a first phase relationship and energizable in a first phase relationship for producing a force between the second member and the first area of the first member to provide a displacement of the second member relative to the first member along the first axis and with the second member including second means cooperative with the first area in a second phase relationship different from the first phase relationship and energizable in the second phase relationship for producing a force between the second member and the first area of the first member to provide a displacement of the second member relative to the first member along the first axis and with the displacement provided by the force from the second means compensating for nonlinearities in the displacement provided by the force from the first means, each of the first and second means including a pair of means having a phase displacement different from the displacement between the first and second phase relationships and energizable in phases differing by such phase displacement.

2. The positioning system of claim 1 wherein the first member includes at least a second separate area defining coordinate relationship with the first area and having a second energy configuration and with the second member including third and fourth means spaced from the first and second means and defining the coordinate relationship with the first and second means and cooperative with the second separate area and having the first and second phase relationships and with the third and fourth means energizable in the first and second phase relationships with respect to the cooperative dispositions between the third and fourth means and the second separate area for producing forces between the second member and the second area of the first member to provide an independent displacement of the second member relative to the first member along a second axis having the coordinate relationship with the first axis and with the displacement provided by the force from the fourth means compensating for nonlinearities in the displacement provided by the force from the third means, each of the third and fourth means including a pair of means having a phase displacement corresponding to the phase displacement between the pair of means in the first and second means and energizable in phases differing by such phase displacements.

3. The positioning system of claim 1 wherein the first area and a second area on the first member form a magnetic grid pattern providing a first and second energy configurations along the first axis and a second coordinate axis and with the second member including third and fourth means spaced from the first and second means and disposed along the second axis and magnetically cooperative with the magnetic grid pattern on the first member and with the third and fourth means energizable in the first and second phase relationships with respect to the cooperative dispositions between the third and fourth means and the magnetic grid pattern for producing forces between the second member and the first member to provide an independent displacement of the second member relative to the first member along the second axis and with the displacement provided by the force from the fourth means compensating for non-linearities in the displacement provided by the force from the third means and with the first and second means producing a magnetic interaction with the magnetic grid pattern on the first member to generate the forces along the first axis and with the third and fourth means producing a magnetic interaction with the magnetic grid pattern on the first member to generate the forces along the second axis and with each of the third and fourth means including a pair of means having a phase displacement corresponding to the phase displacement between the pair of means in the first and second means and energizable in phases differing from such phase displacements.

4. The positioning system of claim 1 wherein the first member forms a flat surface and the second member is linearly displaced along the first axis.

5. The positioning system of claim 1 wherein the first means is energized with a first signal in the first phase relationship, the second means is energized with a second signal similar to the first signal but in the second phase relationship and wherein the first and second members and the first and second means are constructed to define a reluctance motor.

6. The positioning system of claim 5 wherein the first and second means are physically along the first axis a distance conforming to the phase displacement between the first and second signals.

7. The positioning system of claim 5 wherein the first and second signals have a 45° phase displacement and the first and second means have phase displacements of 45° along the first axis.

8. A positioning system for producing a controlled relative movement between a head and a platen along at least a first axis, incuding:

a magnetic platen having at least a first magnetic configuration area and with the magnetic configuration area being disposed along the first axis, and a head positioned adjacent to the platen for movement relative to the platen along the first axis and with the head including first magnetic means disposed along the first axis in a first phase relationship and energizable in the first phase for providing a first force between the head and the first magnetic configuration area to provide movement of the head relative to the platen along the first axis and with the head including second magnetic means disposed along the first axis in a second phase relationship different from the first configuration and energizable in the second phase for providing a second force between the head and the first magnetic configuration area to provide movement of the head relative to the platen along the first axis and with the first and second means providing complementary forces in accordance with the first and second phase relationships to enhance the linearity of movement of the head along the first axis and with each of the first and second means including a pair of means disposed along the first axis in a particular phase displacement relative to each other and energizable in a relationship corresponding to the particular phase displacement.

9. The positioning system of claim 8 wherein the magnetic platen includes at least a second separate magnetic configuration area disposed along a second axis coordinate with the first axis and having a second magnetic configuration and with the head including third and fourth magnetic means spaced from the first and second magnetic means and respectively disposed along the second axis in the first and second phase relationships and with the third and fourth means respectively energizable in the first and second phases for producing a force between the head and the second area of the magnetic platen to provide an independent displacement of the head realtive to the magnetic platen along the second coordinate axis with the third and fourth means providing complementary forces in accordance with such first and second phase relationships to enhance the linearity of movement of the head along the first axis and with each of the third and fourth means including a pair of means disposed along the second axis in the particular phase displacement relative to each other and energizable in a relationship corresponding to the particular phase displacement.

10. the positioning system of claim 8 wherein the magnetic platen forms a magnetic grid pattern providing first and second magnetic configurations along the first axis and a second coordinate axis and with the head including third and fourth magnetic means spaced from the first and second magnetic means and disposed along the second coordinate axis in the first and second phase relationships and with the third and fourth means respectively energizable in the first and second phase relationships for producing forces between the head and the second magnetic configuration to provide a displacement of the head relative to the magnetic platen along the second coordinate axis and with the third and fourth means providing complementary forces to enhance the linearity of movement of the head along the second axis and with the first and second magnetic means and the magnetic grid pattern on the magnetic platen defining a first magnetic reluctance motor and with each of the third and fourth magnetic means including a pair of means disposed along the second axis in the particular phase displacement relative to each other and energizable in a relationship corresponding to the particular phase displacement and with the third and fourth magnetic means and the magnetic grid pattern on the magnetic platen defining a second magnetic reluctance motor.

11. The positioning system of claim 8 wherein the first magnetic means of the head are energized with first periodic signals and the second magnetic means of the head are energized with second periodic signals and wherein the first and second periodic signals have similar characteristics except for a particular phase displacement and wherein the first and second magnetic means and the magnetic grid pattern on the magnetic platen define a magnetic reluctance motor.

12. The positioning system of claim 11 wherein the first and second magnetic means are physically displaced along the first axis a particular distance conforming to the phase displacement between the first and second periodic signals.

13. The positioning system of claim 11 wherein the first and second periodic signals have a 45° phase displacement.

14. A positioning system providing a controlled relative movement between a head and a platen along first and second coordinate axes, including:

a platen having areas defining first and second energy configurations along fist and second coordinate axes, a head positioned adjacent to the platen for movement relative to the platen along the first and second coordinate axes and with the head including first and second means disposed in a first particular phase relationship along the first axis and energizable in the first particular phase relationship for providing forces between the head and the first area to provide a movement of the head along the first coordinate axis and with the head including third and fourth means disposed in the first particular phase relationship along the second axis and energizable in the first particular phase relationship for providing forces between the head and the second area to provide a movement of the head along the second coordinate axis and with each of the first and second means including a pair of means disposed in a second particular phase relationship along the first axis and energizable in the second particular phase relationship and with each of the third and fourth means including a pair of means disposed in the particular phase relationship along the second axis and energizable in the second particular phase relationship, and means for individually energizing the first and second means respectively in the first phase relationship and the pair of means in each of the first and second means in the second phase relationship to provide compensating forces to enhance linearity in the movement of the head along the first coordinate axis and for individually energizing the third and fourth means respectively in the first phase relationship and the pair of means in the third and fourth means in the second phase relationship to provide compensating forces to enhance lineraity in the movement of the head along the second coordinate axis.

15. The positioning system of claim 3 wherein the platen includes a third separate area having the second energy configuration corresponding to the second coordinate axis and spaced from the second separate area and with the head including fifth and sixth means disposed in the first particular configuration along the secnd axis and energizable with the third and fourth means in the first phase relationship for providing a force between the head and the second and third areas to provide a movement of the head along the second coordinate axis and with each of the fifth and sixth means including a pair of means disposed in the second phase relationship along the second axis and energizable in the second phase relationship.

16. The positioning system of claim 14 wherein the first and second means and the first separate area are magnetic and the third and fourth means and the second separate area are magnetic and means are provided for introducing to the first and second means signals displaced in phase by the first phase relationship to energize the first and second means and for introducing to the pair of means in each of the first and second means signals displaced in phase by the second phase relationship and means are provided for introducing to the third and fourth means signals displaced in phase by the second phase relationship to energize the third and fourth means and for introducing to the pair of means in each of the third and fourth means signals displaced in phase by the second phase relationship.

17. The positioning system of claim 16 wherein the first and second means are physically displaced along the first axis a distance conforming to the phase displacement of the signals in the first phae relationship and the third and fourth means are physically displaced along the second axis a distance conforming to the phase displacement of the signals in the first phase relationship and the pair of means in each of the first and second means are physcially displaced along the first axis a distance conforming to the signals in the second phase relationship and the pair of means in each of the third and fourth means are physically displaced along the second axis a distance conforming to the signals in the second phase relationship.

18. The positioning system of claim 16 wherein the signals energizing the first and second means are phase displaced 45° and the signals energizing the third and fourth means are phase displaced 45° and the signals energizing the pair of means in each of the first and second means are phase displaced 90° and the signals energizing the pair of means in each of the third and fourth means are phase displaced 90°.

19. A positioning system providing a controlled relative movement between a head and a magnetic platen along first and second coordinate axes, including:
   a flat platen having a grid pattern extending along the first coordinate axis and extending along the second coordinate axis,
   a head positioned adjacent to the platen for movement relative to the platen along the first and second coordinate axes and with the head including first and second means displaced in a first particular phase relationship along the first axis and energizable in the first particular phase relationship for providing compensating forces between the head and the grid pattern on the platen to provide a movement of the head relative to the platen along the first coordinate axis and with the head including third and fourth means displaced in the first particular phase relationship along the second axis and energizable in the first particular phase relationship for providing compensating forces between the head and the grid pattern on the platen to provide a linear movement of the head relative to the platen along the second coordinate axis and with each of the first and second means including a pair of means displaced along the first axis in a second particular phase relationship and energizable in the second particular phase relationship and with each of the third and fourth including a pair of means displaced along the second axis in the second particular phase relationship and energizable in the second particular phase relationship, and
   means for individually energizing the first and second means in the first particular phase relationship and the third and fourth means in the first particular phase relationship and the pair of means in each of the first and second means in the second particular phase relationship and the pair of means in each of the third and fourth means in the second particular phase relationship.

20. The positioning system of claim 19 wherein the first and second means form a reluctance motor with the grid pattern on the platen and the third and fourth means form a reluctance motor with the grid pattern on the platen.

21. The positioning system of claim 20 wherein the first and third means are physically displaced respectively from the second and fourth means a distance conforming to the phase displacement between the signals energizing such means and the pair of means in each of the first, second, third and fourth means are physically displaced from each other a distance conforming to the phase displacement between the signals energizing such pair of means.

22. The positioning system of claim 20 wherein the signals energizing the first and third mans are respectively phase displaced 45° from the signals energizing the second and fourth means and wherein the signals energizing the pair of means in each of the first, second, third and fourth means are phase displaced 90°.

23. The positioning system of claim 13 wherein the first and second magnetic means have a 45° phase displacement along the first axis.

24. The positioning system of claim 23 wherein the first periodic signals constitute a pair of signals having a 90° phase displacement and the second periodic signals constitute a pair of signals having a 90° phase displacement.

25. The position system set forth in claim 14 wherein the areas on the platen constitute first and second separate areas having first and second energy configurations corresponding to the first and second coordinate axes.

26. The positioning system of claim 15 wherein the first separate area is disposed between the second and third separate areas and wherein the first and second means is disposed between the third and fourth means and the fifth and sixth means.

27. The positioning system of claim 18 wherein the first magnetic area and the first and second means define a first reluctance motor and the second magnetic area and the third and fourth define a second reluctance motor.

28. The positioning system of claim 27 wherein the platen is magnetic and the grid pattern on the platen is magnetic and the first, second, third and fourth means are magnetic.

* * * * *